March 24, 1970   F. P. FEHLNER   3,502,554
METHOD FOR FORMING THIN FILMS
Filed July 14, 1967

INVENTOR.
FRANCIS P. FEHLNER
BY *William J. Simmons*
ATTORNEY

United States Patent Office 3,502,554
Patented Mar. 24, 1970

3,502,554
METHOD FOR FORMING THIN FILMS
Francis P. Fehlner, Big Flats, N.Y., assignor to Corning Glass Works, Corning, N.Y., a corporation of New York
Filed July 14, 1967, Ser. No. 653,431
Int. Cl. B01k 1/00; C01d 7/34
U.S. Cl. 204—130    14 Claims

ABSTRACT OF THE DISCLOSURE

A method is disclosed for forming thin films consisting of at least two materials, one of the materials being a constituent of a solid electrolyte. Under suitable environmental conditions, a metal can be deposited at the cathode of an electrochemical cell which utilizes glass as the electrolyte. If the temperature is sufficiently high, the deposited metal can form an alloy with the metal which forms the cathode.

BACKGROUND OF THE INVENTION

Silicate glasses consist of an irregular network of silicon and oxygen atoms with very strong and highly directed bonds. Within the structure of this network may also occur certain other atoms such as aluminum which contrasts with the silicon atoms in being trivalent and probably possessing bonds that are somewhat less strongly directed. Embedded in and surrounded by this very strong and elastic network are monovalent and divalent ions. The monovalent ions possess the greatest ability of internal movement, especially under the influence of an electric potential. Examples of such ions include ions of alkali metals, copper, silver, tin, antimony, lead, zinc, gallium, cadmium, indium and calcium. Under the proper conditions of temperature, atmosphere and electric field, these ions can migrate to an electrode on the surface of a glass substrate which contains such ions and the reduced material can be plated out at that electrode. Although specific reference has been made to ion migration in silicate glasses, it is not intended that this invention be limited thereto; ion migration is also known to occur in glasses of other composition and crystalline materials such as silver iodide.

This invention is based on the discovery of the fact that under proper conditions the ions of certain metals can be diffused under the influence of an electric field to the cathode of an electrochemical cell in which glass is the electrolyte and thereby form an alloy with the metal which forms the cathode of the electrochemical cell when the temperature is sufficiently high. This method is particularly useful for forming alloy thin films wherein one of the alloying materials is a highly reactive metal such as an alkali metal.

Examples of alloys which may be made in accordance with the method of this invention are silver cesium and antimony potassium which are useful as photocathodes, chromium copper which is useful in making memistors, and alkali metal-gold alloys which are useful as variable density optical filters.

Since the method of this invention is particularly useful for forming alloy thin films which include an alkali metal, a prior method of forming a thin film of a sodium gold alloy will now be considered so that the relative complexities of the methods of this invention and of the prior art may be compared. First a thin layer of gold is evaporated on a substrate by any well-known technique such as vacuum deposition. Then a generator containing a sodium compound such as sodium chromate is heated, thereby liberating sodium vapor. An element such as silicon or boron may be added to assist in breaking down the chromate. The sodium vapor is directed to the vicinity of the substrate where, if the temperature is high enough, it chemically reacts with the gold layer to form the intermetallic compound, $NaAu_2$. This entire process must be carried out in a vacuum due to the highly reactive nature of the sodium vapor.

Although the process of this invention is particularly useful where one of the alloying materials is an alkali metal, it is also a convenient process for forming films of metals which do not include alkali metals.

SUMMARY OF THE INVENTION

It is, therefore, an object of this invention to provide a relatively simple and easily controlled method for forming alloy thin films in which one of the alloying materials is a highly reactive metal such as an alkali metal.

A further object of this invention is to provide a novel method for forming alloy thin films in which one of the alloying materials is a constituent of a solid electrolyte.

A further object of this invention is to provide a novel method for forming on a substrate films which consist of at least two metals, one of which is deposited from the substrate.

Briefly, a method of forming films in accordance with this invention is as follows. A substrate is provided which contains the ions of a first metal which is to be reduced at the surface of the substrate on which a film of a second metal is applied. A bias voltage is applied between the metal film and a surface on the substrate opposite that on which the metal film appears. Simultaneously, the substrate and film are heated in a nonreactive atmosphere to a temperature at which ions of the first metal will migrate to the surface of the substrate on which the film is applied where they will become reduced to the first metal.

Other objects, features and advantages of this invention will become apparent during the course of the following detailed description and the attached drawing, on which, by way of example, only the preferred embodiment of this invention is illustrated.

DETAILED DESCRIPTION

Figure 1:
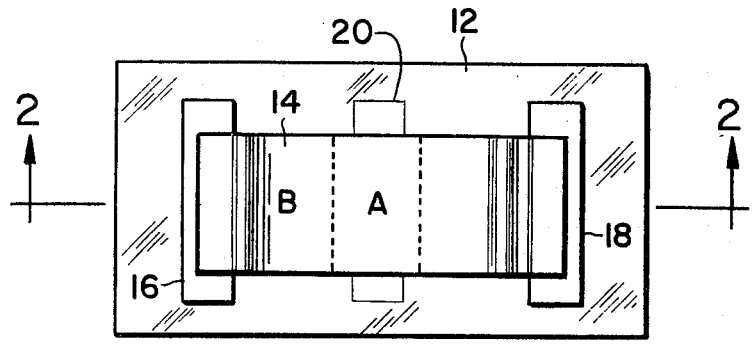
FIG. 1 is a plan view of an alloying apparatus in accordance with this invention.
Figure 2:
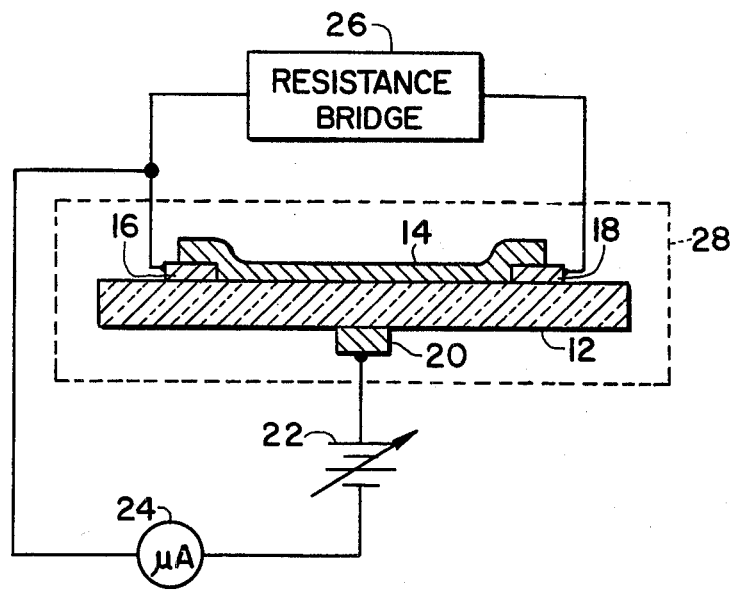
FIG. 2 is a sectional view taken along lines 2—2 of FIG. 1, this view additionally illustrating the bias circuitry.

Referring specifically to FIGS. 1 and 2 there is shown a glass substrate 12 which is utilized in the process of this invention as the electrolyte of an electrochemical cell. Two spaced electrodes 16 and 18 are applied to the surface of the substrate 12. A thin metal film 14 is located on one surface of the glass substrate in contact with the electrodes 16 and 18. The metal film 14 may be several hundred angstroms thick and may be deposited by any one of many well-known deposition techniques. An electrode 20 is applied to the surface of the substrate 12 opposite that on which the metal film 14 is deposited and is preferably located centrally with respect to the film 14. To prevent polarization effects, the electrode 20 may consist of the same metal (or a compound thereof) as that which is present in ionic form in the glass substrate. A variable source of DC potential is connected between the electrodes 16 and 20. A micro-ammeter 24 may be connected in series with the battery 22. A resistance bridge is connected between the electrodes 16 and 18. The assembly consisting of the glass substrate 12, the metallic film 14, and the electrodes 16, 18 and 20 is situated in a heated non-reactive environment which is represented by the dashed lines 28. The term nonreactive environment is intended to include any environment which will not react with either the metal film or the metal forming at the cathode and may consist of a gas such as helium, hydrogen or argon or may be a vacuum.

The thin metal film 14 could consist of any metal. However, since the temperatures at which some metals enter into alloy compositions may be so high that a metal such as an alkali metal emerging from the glass substrate 12 would vaporize into the atmosphere of the evacuated chamber 28, such metals could not be used to form an alloy in accordance with the method of this invention. The electrodes 16, 18 and 20 may consist of any metal which will make a good electrical connection to the thin film 14 while remaining unaffected by the high temperature in the chamber 28. Metals available for diffusion from the glass substrate 12 under the influence of an electric field include the alkali metals, copper, silver, tin, antimony, lead, zinc, gallium, cadmium, indium and calcium. Under the influence of the electric field established between the electrodes 16 and 20 due to the connection of the battery 22 therebetween, ions of the above listed metals will diffuse through the glass substrate 12 to the metallic layer 14. An alloy of the two metals will form if the temperature of the substrate and the metal film is sufficiently high and if they are located in a reducing atmosphere. The micro-ammeter 24 gives an indication of the rate at which the ions diffuse through the glass substrate 12, and the reading obtained therefrom can be used to calculate the total quantity of ions which have migrated to the surface of the substrate. The resistance of the metallic film 14 as determined by the resistance bridge 26 gives an indication of the composition of the film 14.

A specific example will now be given to enable those skilled in the art to more readily practice this invention. A substrate consisting of an alkali borosilicate glass was cleaned in hot 3% hydrogen peroxide. The composition of this glass given in percent of oxide batch constituents is essentially 80% $SiO_2$, 13.8% $B_2O_3$, 4.3% $Na_2O$ and 1.9% $Al_2O_3$. Platinum electrodes 16, 18 and 20 were fired on the substrate. A gold film having a thickness of about 150 angstroms was then evaporated on to the glass substrate from a tungsten loop at a pressure of about $10^{-5}$ torr, and was annealed for a short time to stabilize its resistance. The substrate temperature was held at about 200° C. for both the gold film deposition and the subsequent electrically induced ion diffusion process. AC resistance measurements were carried out in situ using the resistance bridge 26 which is shown in FIG. 2.

The results reported hereinbelow were obtained while holding the temperature in the chamber 28 at about 200° C. for sixteen hours. During this period, a voltage of 400 volts was applied between the electrodes 16 and 20, the battery 22 having its positive terminal connected to the electrode 20. An average current density of 2 $\mu a. cm.^{-2}$ was measured between the bias electrode and the film. An irreversible increase in film resistance with time was observed.

After the film had been removed from the vacuum chamber 28, a visible difference was noted between the gold film over the electrode 20 and that located nearer the electrode 16 (positions A and B respectively, in FIG. 1). The film at position A, which is the region between the dashed lines, appeared cloudy and was slightly buckled.

The film was examined in an electron microscope both in transmission and by diffraction methods. The gold film was stripped from the substrate by immersion in water after deposition of an evaporated carbon film. Pieces of the resultant composite film were picked up on 200-mesh copper grids and several samples were subsequently coated with 50 angstroms of evaporated aluminum to provide a diffraction standard. All observations of the films were carried out at 100 kv.

The differences in appearance between regions A and B of the film 14 were also noted in the electron microscope where it was found that the film in region A was made up of about 1000 angstrom islands which were continuous in the sense that they were connected to one another. The remainder of the film was composed of about 2000 angstrom islands which appeared to be discontinuous. Additionally, both areas A and B were examined by transmission electron diffraction. The diffraction pattern from area B showed only lines of gold. However, the pattern from area A showed lines characteristic of the intermetallic compound, $NaAu_2$, as well as the lines of gold.

The results of the tests described hereinabove indicate that, under the influence of the electric field between the electrodes 16 and 20, sodium ions migrated to the gold film cathode where they were reduced to sodium atoms. Under the environmental conditions in which this process was conducted, the sodium atoms combined with the gold film to form the intermetallic compound $NaAu_2$. As this compound formed, the film resistance increased. The change in resistance for this discontinuous film represented the sum of two processes: the elimination of inter-island gaps by alloy formation and the rearrangement of the islands in the unalloyed portion of the film. The former process decreases film resistance because inter-island gaps are eliminated, and the latter process increases resistance due to an increase in gap distance in the unalloyed portion of the film. The net film resistance showed a slight increase. As a result, film resistance did not provide a direct measure of alloy formation in the discontinuous film, but it would do so in a continuous film, since the resistivity of $NaAu_2$ is higher than that of either sodium or gold alone.

This alloy film is quite stable; it survived in vacuum despite the fact that the vapor pressure of sodium is about $10^{-3}$ torr at 200° C. Furthermore, the $NaAu_2$ failed to react with water during its removal from the substrate.

In a process similar to that described hereinabove for the formation of a sodium-gold alloy, an alloy thin film of antimony and potassium can be formed. Since most aspects of this process are the same as those of the previously described process, only the changes will be described. First a thin film of antimony is deposited on a substrate of a potassium containing glass. An electrode connection is provided at two oppositely located peripheral portions of the antimony film and on the side of the glass opposite that which contains the film. The substrate is then subjected to a temperature of about 350° C. in a nonreactive atmosphere while a potential of about 400 volts is connected to electrodes on opposite sides of the substrate, the thin film of antimony being negative with respect to the electrode on the opposite side of the substrate. After a sufficient period of time has elapsed, the portion of the film above the positive electrode will consist of an alloy of antimony and potassium.

In a similar manner, an alloy of cesium and gold can be formed. Such an alloy should be formed at a temperature of about 250° C., since the alloy formed by these two metals is not stable at higher temperatures. This process would have to be conducted over a period of time which is considerably longer than that required to form an alloy of sodium and gold since the cesium ion migrates more slowly than the sodium ion.

In some instances, due to the particular metals involved or the temperature at which the process is maintained, the metals involved will not form an alloy; however, the metal being reduced at the cathode will form a coating on the metal forming the cathode. If the cathode consists of a discontinuous film, the islands become coated with the metal being reduced. Where the metal being reduced is an alkali metal, the mobility thereof permits atoms thereof to migrate over the entire surface of the islands which constitute the discontinuous film so that even the top portion of the islands opposite that portion which contacts the substrate is coated.

A silver-cesium photo cathode can be made by plating a film of silver with a layer of cesium in accordance with the process of this invention. A discontinuous thin film of silver is deposited on a cesium containing glass substrate. A voltage is applied between the silver film and the side of the glass substrate opposite that on which the silver film is located. The substrate is then placed in a nonreactive environment at a temperature of about 200° C. The cesium ions migrating to the silver film are reduced at the film and migrate on the surface of the islands which constitute the film until a monatomic layer of cesium surrounds the silver islands. At this point, the process can be discontinued since the work function of the silver film has been lowered sufficiently to provide an efficient photocathode.

A memister can also be made by coating a discontinuous thin film of a first metal with a second metal in accordance with the process of this invention. A glass substrate containing a discontinuous thin film of chromium is placed in a nonreactive environment which is at a temperature of about 300 to 400° C. The chromium film is biased negatively with respect to the other side of the substrate which consists of a copper containing glass. As the copper ions migrate through the glass and are reduced at the cathode, the resistance of the thin film changes. The process is reversible in that the amount of copper coating the discontinuous thin chromium film may be decreased merely by reversing the polarity of the bias so that the chromium film is held at a positive potential. Thus, by controlling the bias voltage, the resistance of the film can be controlled.

As previously stated, the conditions for alloy formation are (1) that the temperature be sufficiently high that an alloy can form between the two metals involved, (2) that a high enough electric field be applied to cause ions to migrate through the glass, and (3) that the process be conducted in a nonreactive atmosphere. If the process is not carried out in a nonreactive atmosphere the reduced metal appearing at the cathode of the electrochemical cell may not be permitted to alloy with the thin film cathode. If, for example, the process described in the above specific example were not carried out in a nonreactive atmosphere, the reaction with oxidizing gases in the system could use up the sodium as it migrates out of the substrate. The overall behavior of the film resistance would then depend upon a competition between the rate of migration of sodium out of the glass, the rate of alloy formation, and the rate of reaction of sodium with oxidizing gases in the chamber.

What is claimed is:

1. A method for forming thin metallic films comprising the steps of
   providing a substrate containing ions of a first metal, said substrate having first and second opposed surfaces,
   applying a thin film of a second metal on at least a portion of said first surface,
   applying a bias voltage between said film and said second surface, and simultaneously heating said substrate and said film in a nonreactive atmosphere to a temperature at which said ions will migrate to said portion of said first surface where they become reduced to said first metal.

2. A method as defined by claim 1 wherein said substrate consists of a glass which contains the ions of said first metal.

3. A method as defined by claim 1 wherein the temperature at which said substrate and said film are heated is high enough to permit said first and second metals to form an alloy.

4. A method as defined by claim 1 wherein said first metal is selected from the group consisting of alkali metals, copper, silver, tin, antimony, lead, zinc, gallium, cadmium, indium and calcium.

5. The method as defined by claim 1 wherein said first metal consists of an alkali metal and said second metal is selected from the group consisting of gold and silver.

6. The method as defined by claim 1 wherein said first metal is sodium and said second metal is gold.

7. The method as defined by claim 1 wherein said first metal is potassium and said second metal is antimony.

8. The method as defined by claim 1 wherein said first metal is cesium and said second metal is gold.

9. The method as defined by claim 1 wherein said first metal is cesium and said second metal is silver.

10. The method as defined by claim 1 wherein said first metal is copper and said second metal is chromium.

11. A method for forming thin films comprising the following steps:
    providing a substrate containing ions of a first metal, said substrate having first and second opposed surfaces,
    applying a thin film of a second metal on at least a portion of the first surface of said substrate,
    applying a bias voltage between said film and the second surface of said substrate, and simultaneously heating the substrate and film in a reducing atmosphere to a temperature at which said first and second metals form an alloy whereby ions will migrate to said first surface and become reduced to said first metal which combines with said second metal to form an alloy.

12. The method as defined by claim 11 wherein said substrate consists of a glass containing ions of said first metal.

13. The method as defined by claim 11 wherein said first metal is selected from the group consisting of alkali metals, copper, silver, tin, antimony, lead, zinc, gallium, cadmium, indium and calcium.

14. A method for forming alloy thin films comprising the following steps:
    providing a glass substrate containing ions of a first metal, said substrate having first and second opposed surfaces,
    applying a thin film of a second metal on at least a portion of said first surface of said substrate,
    providing an electrode connection to said thin film,
    providing an electrode on said second surface of said substrate,
    heating said substrate in a reducing atmosphere to a temperature at which said first and second metals enter into an alloy composition, and
    applying a bias voltage to said first and second electrodes, the polarity of said voltage being such that said ions migrate to said first surface of said substrate where they are reduced to a metal which forms an alloy with said second metal.

References Cited

UNITED STATES PATENTS 3,255,033  6/1966  Schmeckenbecher ____ 117—47
3,400,006  9/1968  Berning _____ 117—33.3

HOWARD S. WILLIAMS, Primary Examiner

H. M. FLOURNOY, Assistant Examiner

U.S. Cl. X.R.

75—135; 117—124